United States Patent
Yang et al.

(10) Patent No.: US 12,462,464 B2
(45) Date of Patent: Nov. 4, 2025

(54) ALLOCATION OF PRIMITIVES TO PRIMITIVE BLOCKS

(71) Applicant: Imagination Technologies Limited, Kings Langley (GB)

(72) Inventors: Xile Yang, Rickmansworth (GB); John W. Howson, St. Albans (GB); Jonathan Redshaw, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 252 days.

(21) Appl. No.: 17/961,359

(22) Filed: Oct. 6, 2022

(65) Prior Publication Data

US 2023/0038653 A1    Feb. 9, 2023

Related U.S. Application Data

(63) Continuation of application No. 17/039,564, filed on Sep. 30, 2020, now Pat. No. 11,481,952, which is a
(Continued)

(30) Foreign Application Priority Data

May 29, 2014   (GB) ..................................... 1409530

(51) Int. Cl.
*G06T 15/04* (2011.01)
*G06T 11/00* (2006.01)
(Continued)

(52) U.S. Cl.
CPC ............ *G06T 15/04* (2013.01); *G06T 11/001* (2013.01); *G06T 11/40* (2013.01); *G06T 15/80* (2013.01);
(Continued)

(58) Field of Classification Search
CPC ....... G06T 15/04; G06T 11/001; G06T 11/40; G06T 15/80; G06T 2200/04;
(Continued)

(56) References Cited

U.S. PATENT DOCUMENTS 5,461,712 A    10/1995    Chelstowski et al.
5,504,821 A    4/1996    Kanamori et al.
(Continued)

FOREIGN PATENT DOCUMENTS

CN    102292748 A    12/2011
GB    2264847 A    9/1993
(Continued)

*Primary Examiner* — Charles L Beard
(74) *Attorney, Agent, or Firm* — Potomac Law Group, PLLC; Vincent M DeLuca

(57) ABSTRACT

An application sends primitives to a graphics processing system so that an image of a 3D scene can be rendered. The primitives are placed into primitive blocks for storage and retrieval from a parameter memory. Rather than simply placing the first primitives into a primitive block until the primitive block is full and then placing further primitives into the next primitive block, multiple primitive blocks can be "open" such that a primitive block allocation module can allocate primitives to one of the open primitive blocks to thereby sort the primitives into primitive blocks according to their spatial positions. By grouping primitives together into primitive blocks in accordance with their spatial positions, the performance of a rasterization module can be improved. For example, in a tile-based rendering system this may mean that fewer primitive blocks need to be fetched by a hidden surface removal module in order to process a tile.

20 Claims, 5 Drawing Sheets

Related U.S. Application Data continuation of application No. 14/724,484, filed on May 28, 2015, now Pat. No. 10,957,097.

(51) Int. Cl.
  *G06T 11/40* (2006.01)
  *G06T 15/80* (2011.01)

(52) U.S. Cl.
  CPC .................. *G06T 2200/04* (2013.01); *G06T 2207/10004* (2013.01); *G06T 2207/10024* (2013.01); *G06T 2210/12* (2013.01); *G06T 2210/61* (2013.01); *G06T 2215/06* (2013.01)

(58) Field of Classification Search
  CPC .......... G06T 2207/10004; G06T 2207/10024; G06T 2210/12; G06T 2210/61; G06T 2215/06
  See application file for complete search history.

(56) References Cited

U.S. PATENT DOCUMENTS

| | | | |
|---|---|---|---|
| 5,515,453 A | 5/1996 | Hennessy et al. | |
| 5,572,634 A | 11/1996 | Duluk, Jr. | |
| 5,606,657 A | 2/1997 | Dennison et al. | |
| 5,886,701 A * | 3/1999 | Chauvin | G06T 13/80 345/418 |
| 5,905,502 A * | 5/1999 | Deering | G06T 9/001 708/203 |
| 5,990,904 A | 11/1999 | Griffin | |
| 6,169,554 B1 * | 1/2001 | Deering | G06T 15/30 715/764 |
| 6,192,393 B1 | 2/2001 | Tarantino et al. | |
| 6,246,415 B1 | 6/2001 | Grossman et al. | |
| 6,421,053 B1 | 7/2002 | Johns et al. | |
| 6,424,345 B1 | 7/2002 | Smith et al. | |
| 6,426,750 B1 | 7/2002 | Hoppe | |
| 6,433,789 B1 | 8/2002 | Rosman | |
| 6,438,612 B1 | 8/2002 | Ylonen et al. | |
| 6,456,283 B1 | 9/2002 | Ishida | |
| 6,525,726 B1 | 2/2003 | Xie et al. | |
| 6,552,723 B1 | 4/2003 | Duluk, Jr. et al. | |
| 6,597,363 B1 * | 7/2003 | Duluk, Jr. | G06T 15/50 345/506 |
| 6,720,964 B1 | 4/2004 | Fowler et al. | |
| 6,798,410 B1 * | 9/2004 | Redshaw | G06T 15/00 345/427 |
| 6,879,324 B1 | 4/2005 | Hoppe | |
| 6,894,704 B1 | 5/2005 | Bourdev et al. | |
| 7,023,437 B1 | 4/2006 | Voorhies et al. | |
| 7,170,515 B1 | 1/2007 | Zhu | |
| 7,505,036 B1 | 3/2009 | Baldwin | |
| 7,720,095 B2 | 5/2010 | Desai et al. | |
| 8,223,157 B1 | 7/2012 | Baldwin et al. | |
| 8,253,730 B1 | 8/2012 | Carr | |
| 8,289,319 B2 | 10/2012 | Nordlund et al. | |
| 8,310,487 B2 | 11/2012 | Howson | |
| 8,692,848 B2 | 4/2014 | Adams et al. | |
| 8,704,826 B1 | 4/2014 | Hakura et al. | |
| 8,717,357 B2 | 5/2014 | McCombe et al. | |
| 8,751,763 B1 | 6/2014 | Ramarao | |
| 8,760,460 B1 | 6/2014 | Kilgariff et al. | |
| 8,773,447 B1 | 7/2014 | Donham | |
| 8,817,026 B1 | 8/2014 | Zimmerman | |
| 8,830,246 B2 | 9/2014 | Seetharamaiah et al. | |
| 8,854,384 B2 | 10/2014 | Keall et al. | |
| 9,098,943 B1 | 8/2015 | Baldwin | |
| 9,105,131 B2 | 8/2015 | Howson | |
| 9,250,961 B2 | 2/2016 | Howson et al. | |
| 9,286,649 B2 | 3/2016 | Balci et al. | |
| 9,317,948 B2 | 4/2016 | Tapply et al. | |
| 9,336,623 B2 | 5/2016 | Yang | |
| 9,384,584 B2 | 7/2016 | Yang | |
| 9,501,847 B1 | 11/2016 | Purcell et al. | |
| 9,501,860 B2 | 11/2016 | Barringer et al. | |
| 9,514,563 B2 | 12/2016 | Ellis et al. | |
| 9,519,982 B2 | 12/2016 | Heggelund et al. | |
| 9,536,341 B1 | 1/2017 | Rhoades et al. | |
| 9,553,807 B2 | 1/2017 | Shelar et al. | |
| 9,607,352 B2 | 3/2017 | Yang et al. | |
| 9,612,839 B2 | 4/2017 | Hakura et al. | |
| 9,619,937 B2 | 4/2017 | Persson et al. | |
| 9,747,660 B2 | 8/2017 | Redshaw | |
| 9,830,738 B2 * | 11/2017 | Redshaw | G06T 15/405 |
| 10,019,820 B2 | 7/2018 | Sorgard et al. | |
| 10,600,231 B2 * | 3/2020 | Woop | G06T 15/08 |
| 10,810,785 B2 * | 10/2020 | Muthler | G06T 15/005 |
| 11,030,797 B2 * | 6/2021 | Brigg | G06T 15/20 |
| 11,164,360 B2 * | 11/2021 | Laine | G06T 1/20 |
| 11,681,754 B2 * | 6/2023 | Gupta | G06F 16/9024 707/798 |
| 2001/0055032 A1 * | 12/2001 | Saito | G06V 10/46 345/660 |
| 2002/0060685 A1 | 5/2002 | Handley et al. | |
| 2002/0085010 A1 | 7/2002 | McCormack et al. | |
| 2002/0118188 A1 | 8/2002 | Zviaguina et al. | |
| 2002/0130886 A1 | 9/2002 | Baldwin | |
| 2003/0011592 A1 * | 1/2003 | Southwell | G06T 15/005 345/420 |
| 2003/0037103 A1 | 2/2003 | Salmi et al. | |
| 2003/0122832 A1 * | 7/2003 | Doyle | G06T 15/005 345/530 |
| 2003/0122833 A1 | 7/2003 | Doyle | |
| 2003/0142104 A1 | 7/2003 | Lavelle et al. | |
| 2004/0022322 A1 | 2/2004 | Dye | |
| 2004/0139080 A1 | 7/2004 | Schmidt et al. | |
| 2004/0183816 A1 | 9/2004 | Leather et al. | |
| 2004/0196281 A1 | 10/2004 | Huang | |
| 2004/0201592 A1 | 10/2004 | Huang | |
| 2005/0057564 A1 | 3/2005 | Liao et al. | |
| 2005/0062750 A1 | 3/2005 | Hong | |
| 2005/0162435 A1 | 7/2005 | Hashimoto et al. | |
| 2005/0203930 A1 | 9/2005 | Bukowski et al. | |
| 2006/0187229 A1 * | 8/2006 | Shao | G06T 15/005 345/553 |
| 2006/0256112 A1 | 11/2006 | Heirich et al. | |
| 2007/0146378 A1 | 6/2007 | Sorgard et al. | |
| 2007/0268290 A1 | 11/2007 | Naoi | |
| 2008/0088619 A1 | 4/2008 | Shearer et al. | |
| 2008/0088622 A1 | 4/2008 | Shearer | |
| 2008/0100627 A1 | 5/2008 | Nystad et al. | |
| 2008/0143978 A1 | 6/2008 | Damera-Venkata et al. | |
| 2008/0150950 A1 | 6/2008 | Sorgard et al. | |
| 2008/0208530 A1 | 8/2008 | Kumanan et al. | |
| 2008/0273031 A1 * | 11/2008 | Shao | G06T 15/005 345/420 |
| 2009/0049452 A1 | 2/2009 | Kriegel et al. | |
| 2009/0066694 A1 | 3/2009 | Redshaw et al. | |
| 2009/0073167 A1 | 3/2009 | Brown et al. | |
| 2009/0167763 A1 | 7/2009 | Waechter et al. | |
| 2009/0174706 A1 | 7/2009 | Howson | |
| 2009/0183167 A1 | 7/2009 | Kupferschmidt et al. | |
| 2009/0262132 A1 | 10/2009 | Peterson et al. | |
| 2009/0282359 A1 | 11/2009 | Saul et al. | |
| 2010/0060637 A1 | 3/2010 | Shearer | |
| 2010/0079452 A1 | 4/2010 | Zhou et al. | |
| 2010/0177105 A1 * | 7/2010 | Nystad | G06T 15/005 345/553 |
| 2011/0037763 A1 * | 2/2011 | Lee | G06T 9/001 345/419 |
| 2011/0046923 A1 * | 2/2011 | Lee | G06T 9/001 703/1 |
| 2011/0080415 A1 * | 4/2011 | Duluk, Jr. | G06T 1/20 345/506 |
| 2011/0090251 A1 | 4/2011 | Donovan et al. | |
| 2011/0109638 A1 * | 5/2011 | Duluk, Jr. | G06T 1/20 345/522 |
| 2011/0148919 A1 | 6/2011 | Heggelund et al. | |
| 2011/0216069 A1 | 9/2011 | Keall et al. | |
| 2011/0254852 A1 | 10/2011 | Howson | |
| 2011/0267346 A1 * | 11/2011 | Howson | G06T 15/005 345/423 |

(56) References Cited

U.S. PATENT DOCUMENTS

| | | | |
|---|---|---|---|
| 2011/0292032 A1 | 12/2011 | Yang | |
| 2011/0304608 A1 | 12/2011 | Yang | |
| 2012/0062553 A1* | 3/2012 | Yang | G06T 9/00 345/419 |
| 2012/0188241 A1* | 7/2012 | Ahn | H04N 19/44 345/420 |
| 2012/0249553 A1 | 10/2012 | Peterson et al. | |
| 2013/0021358 A1 | 1/2013 | Nordlund et al. | |
| 2013/0057653 A1 | 3/2013 | Park et al. | |
| 2013/0067502 A1 | 3/2013 | Blanco et al. | |
| 2013/0069943 A1 | 3/2013 | Kallio et al. | |
| 2013/0100132 A1 | 4/2013 | Katayama et al. | |
| 2013/0120380 A1 | 5/2013 | Kallio et al. | |
| 2013/0135322 A1 | 5/2013 | Seetharamaiah et al. | |
| 2013/0265298 A1 | 10/2013 | Moon et al. | |
| 2013/0325317 A1 | 12/2013 | Pylappan et al. | |
| 2013/0328937 A1 | 12/2013 | Pirwani et al. | |
| 2014/0071122 A1* | 3/2014 | Howson | G06T 11/40 345/419 |
| 2014/0118347 A1 | 5/2014 | Hakura et al. | |
| 2014/0118364 A1 | 5/2014 | Hakura et al. | |
| 2014/0118376 A1 | 5/2014 | Hakura et al. | |
| 2014/0139534 A1 | 5/2014 | Tapply et al. | |
| 2014/0267258 A1 | 9/2014 | Yang et al. | |
| 2014/0292782 A1 | 10/2014 | Fishwick et al. | |
| 2014/0333620 A1 | 11/2014 | Park et al. | |
| 2014/0347357 A1* | 11/2014 | Kim | G06T 11/40 345/420 |
| 2014/0354654 A1 | 12/2014 | Heggelund et al. | |
| 2014/0354661 A1 | 12/2014 | Balci et al. | |
| 2014/0354666 A1 | 12/2014 | Yang | |
| 2014/0368521 A1 | 12/2014 | Lassen et al. | |
| 2014/0375641 A1 | 12/2014 | Bakalash | |
| 2015/0036162 A1 | 2/2015 | Belbin et al. | |
| 2015/0091904 A1 | 4/2015 | Lee et al. | |
| 2015/0097830 A1 | 4/2015 | Jeong et al. | |
| 2015/0161760 A1 | 6/2015 | Nordstoga | |
| 2015/0170324 A1 | 6/2015 | Howson et al. | |
| 2015/0170328 A1 | 6/2015 | Redshaw | |
| 2015/0170407 A1 | 6/2015 | Redshaw | |
| 2015/0187117 A1 | 7/2015 | Balci et al. | |
| 2015/0213638 A1 | 7/2015 | Dimitrov et al. | |
| 2015/0228049 A1 | 8/2015 | Yang et al. | |
| 2015/0228111 A1 | 8/2015 | Kim et al. | |
| 2015/0269773 A1 | 9/2015 | Pearson et al. | |
| 2015/0302629 A1 | 10/2015 | Obert et al. | |
| 2015/0317818 A1 | 11/2015 | Howson et al. | |
| 2015/0331675 A1 | 11/2015 | Magalhaes | |
| 2015/0379672 A1 | 12/2015 | Wang et al. | |
| 2015/0379684 A1* | 12/2015 | Ramani | G06T 11/40 345/531 |
| 2016/0005143 A1 | 1/2016 | Liu et al. | |
| 2016/0005195 A1 | 1/2016 | Sorgard et al. | |
| 2016/0037149 A1* | 2/2016 | Nishikawa | G06T 11/001 348/46 |
| 2016/0071234 A1* | 3/2016 | Lehtinen | G06T 15/80 345/555 |
| 2016/0098856 A1 | 4/2016 | Broadhurst et al. | |
| 2016/0110914 A1 | 4/2016 | Cho et al. | |
| 2016/0117855 A1 | 4/2016 | Lee et al. | |
| 2016/0125649 A1 | 5/2016 | Jeong et al. | |
| 2016/0148424 A1 | 5/2016 | Chung et al. | |
| 2016/0163014 A1 | 6/2016 | Yang et al. | |
| 2016/0217607 A1 | 7/2016 | Hendrey | |
| 2016/0217608 A1 | 7/2016 | Howson | |
| 2016/0221262 A1* | 8/2016 | Das | B22C 9/24 |
| 2016/0240000 A1* | 8/2016 | Fishwick | G06T 15/005 |
| 2016/0260241 A1 | 9/2016 | Jin et al. | |
| 2016/0260249 A1* | 9/2016 | Persson | G06T 1/20 |
| 2016/0307342 A1 | 10/2016 | Lee et al. | |
| 2017/0053375 A1 | 2/2017 | Bolz et al. | |
| 2017/0069126 A1 | 3/2017 | Sansottera et al. | |
| 2017/0069132 A1 | 3/2017 | Howson et al. | |
| 2017/0091246 A1* | 3/2017 | Risvik | G06F 16/2471 |
| 2017/0178386 A1* | 6/2017 | Redshaw | G06F 9/5083 |
| 2017/0262951 A1* | 9/2017 | Smith | G06T 11/40 |
| 2017/0316604 A1 | 11/2017 | Yang et al. | |
| 2017/0330372 A1* | 11/2017 | Kakarlapudi | G06T 11/40 |
| 2018/0144538 A1 | 5/2018 | Jeong et al. | |
| 2018/0197270 A1* | 7/2018 | Howson | H04N 19/00 |
| 2019/0005704 A1* | 1/2019 | Howson | G06T 1/20 |
| 2019/0042304 A1 | 2/2019 | Wang et al. | |
| 2019/0096077 A1 | 3/2019 | Allu et al. | |
| 2019/0311516 A1* | 10/2019 | Van Benthem | G06T 17/20 |
| 2020/0005504 A1* | 1/2020 | Van Benthem | G06T 15/005 |
| 2020/0035328 A1 | 1/2020 | Alberti et al. | |
| 2020/0118301 A1* | 4/2020 | Connelly | G06T 19/20 |
| 2020/0202612 A1 | 6/2020 | Yang et al. | |
| 2020/0242828 A1* | 7/2020 | Brigg | G06T 11/40 |
| 2021/0248806 A1* | 8/2021 | Yang | G06T 1/20 |
| 2021/0295584 A1* | 9/2021 | Engh-Halstvedt | G06T 1/20 |
| 2022/0036638 A1* | 2/2022 | Rabbani Rankouhi | G06T 1/20 |
| 2022/0253982 A1* | 8/2022 | Beaumont | G06T 5/70 |
| 2022/0398004 A1* | 12/2022 | Hellsten | G06F 3/0482 |

FOREIGN PATENT DOCUMENTS

| | | |
|---|---|---|
| GB | 2442266 A | 4/2008 |
| GB | 2466576 A | 6/2010 |
| GB | 2483502 A | 3/2012 |
| WO | 2010070302 A2 | 6/2010 |

* cited by examiner

ALLOCATION OF PRIMITIVES TO PRIMITIVE BLOCKS

BACKGROUND

Graphics processing systems are used to process graphics data. For example, an application running on a computing system may need to render an image of a three dimensional (3D) scene for display to a user. The application can send graphics data, typically in the form of a sequence of primitives to a graphics processing system which can render the image of the scene in accordance with the primitives.

FIG. 1 shows some elements of a graphics processing system 100 which may be used to render an image of a 3D scene. The graphics processing system 100 comprises a graphics processing unit (GPU) 102 and two portions of memory $104_1$ and $104_2$. It is noted that the two portions of memory $104_1$ and $104_2$ may, or may not, be parts of the same physical memory, and typically both memories $104_1$ and $104_2$ are situated "off-chip", i.e. not on the same chip as the GPU 102. Communication between the memories ($104_1$ and $104_2$) and the GPU 102 may take place over a conventional communications bus in the system 100, as is known in the art.

In the example shown in FIG. 1, the graphics processing system 100 is a tile-based deferred rendering system, meaning that the rendering space of the system 100 is divided into a plurality of tiles and that hidden surface removal is performed on a primitive fragment prior to performing texturing and/or shading on the primitive fragment in order to render the scene. However, in other examples, graphics processing systems may be non tile-based and/or not deferred rendering systems. The GPU 102 comprises a geometry processing module 106, a tiling module 108 and a rasterization module 110, wherein the rasterization module 110 comprises a hidden surface removal (HSR) module 112 and a texturing/shading module 114. The graphics processing system 100 is arranged such that a sequence of primitives provided by an application is received at the geometry processing module 106. The geometry processing module 106 performs functions such as clipping and culling to remove primitives which do not fall into a visible view or rendering space of the computing system. The geometry processing module 106 may also project the primitives into screen-space. The geometry processing module 106 puts the received primitives into primitive blocks. Each primitive block has a header which includes state information (such as a depth compare mode, a blending state, a texture state, a primitive type, etc.) to describe how the primitives in the primitive block are to be rendered. There are many reasons to split the sequence of primitives into primitive blocks. For example, splitting the sequence of primitives into primitive blocks in this way is useful so that the primitives can be stored and fetched from memory in small, manageable blocks. Furthermore, there may be a limited number of vertices in each primitive block (e.g. up to 64 vertices in each primitive block), so indices of the vertices in a primitive block can be represented with a fixed number of bits, for example only 6 bits are needed for the indices when the primitive block stores up to 64 vertices. Therefore, splitting the sequence of primitives into primitive blocks will reduce the cost of vertex index data storage in computer graphics processing hardware. Furthermore, there are often many primitives which share the same state, so including these primitives in the same primitive block means that they can share the same state information in the header of the primitive block, which may reduce the total amount of state information needed for the primitives. Furthermore, splitting the sequence of primitives into primitive blocks allows for more opportunities to compress the primitive blocks before storing them in a memory. For example, if the first byte of all of the primitives in a primitive block are the same then the primitives can be compressed by storing the data for the first byte just once and an indication that this byte is to be used for every primitive within the primitive block. This is just one example of many ways in which primitive data within a primitive block can be compressed.

As a person skilled in the art will know, the sequence order of the incoming primitives can affect the way in which the scene is rendered. For example, if a plurality of overlapping primitives are translucent then the order in which they are processed will typically affect the way in which in the primitives are blended to form the rendered scene. Therefore, in order to maintain the sequence order of the incoming primitives, the geometry processing module 106 places them into primitive blocks without altering their sequence order. The primitives are initially put into a first primitive block and when the first primitive block is full then it can be output from the geometry processing module 106 and further incoming primitives can be placed into a new primitive block. In this way the sequence order of the primitives is maintained in the primitive blocks that are output from the geometry processing module 106. A primitive block may be considered to be "full" if the number of vertices in the primitive block is greater than or equal to a vertex threshold (e.g. the maximum number of vertices in a primitive block may be 64 or 256 to give two examples) and/or if the number of primitives in the primitive block is greater than or equal to a primitive threshold (e.g. the maximum number of primitives in a primitive block may be 128 or 512 to give two examples).

The primitive blocks which are output from the geometry processing module 106 are passed to the tiling module 108 which determines which primitives are present within each of the tiles of the rendering space of the graphics processing system 100. The tiling module 108 determines per-tile display lists which indicate which primitives are present within each of the tiles of the rendering space. The display lists and the primitive blocks are outputted from the tiling module 108 and stored in the memory $104_1$. The rasterization block 110 fetches the display list for a tile and the primitive blocks relevant to that tile from the memory $104_1$ and the HSR module 112 performs hidden surface removal to thereby remove fragments of primitives which are hidden in the scene. The remaining fragments are passed to the texturing/shading module 114 which performs texturing and/or shading on the fragments to determine pixel values of a rendered image which can be passed to the memory $104_2$ for storage in a frame buffer. The rasterization block 110 processes each of the tiles and when the whole image has been rendered and stored in the memory $104_2$, the image can be outputted from the graphics processing system 100 and, for example, displayed on a display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of allocating primitives to primitive blocks at a primitive block allocation module which includes a data store for storing a set of primitive blocks to which primitives can be allocated, the method comprising: receiving a sequence of primitives; and for each of the received primitives, if at least one primitive block is stored in the data store: (i) comparing an indication of a spatial position of the received primitive with at least one indication of a spatial position of the at least one primitive block stored in the data store; and (ii) allocating the received primitive to a primitive block based on the result of the comparison, such that the received primitive is allocated to a primitive block in accordance with its spatial position.

There is also provided a primitive block allocation module for allocating primitives to primitive blocks, the primitive block allocation module comprising: a data store configured to store a set of primitive blocks to which primitives can be allocated; and allocation logic configured to: (a) receive a sequence of primitives, and (b) for each of the received primitives, if at least one primitive block is stored in the data store: (i) compare an indication of a spatial position of the received primitive with at least one indication of a spatial position of the at least one primitive block stored in the data store, and (ii) allocate the received primitive to a primitive block based on the result of the comparison, to thereby allocate the received primitive to a primitive block in accordance with its spatial position.

There may also be provided computer readable code adapted to perform the steps of any of the methods described herein when the code is run on a computer. There may also be provided computer readable code for generating a graphics processing unit comprising the primitive block allocation module according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
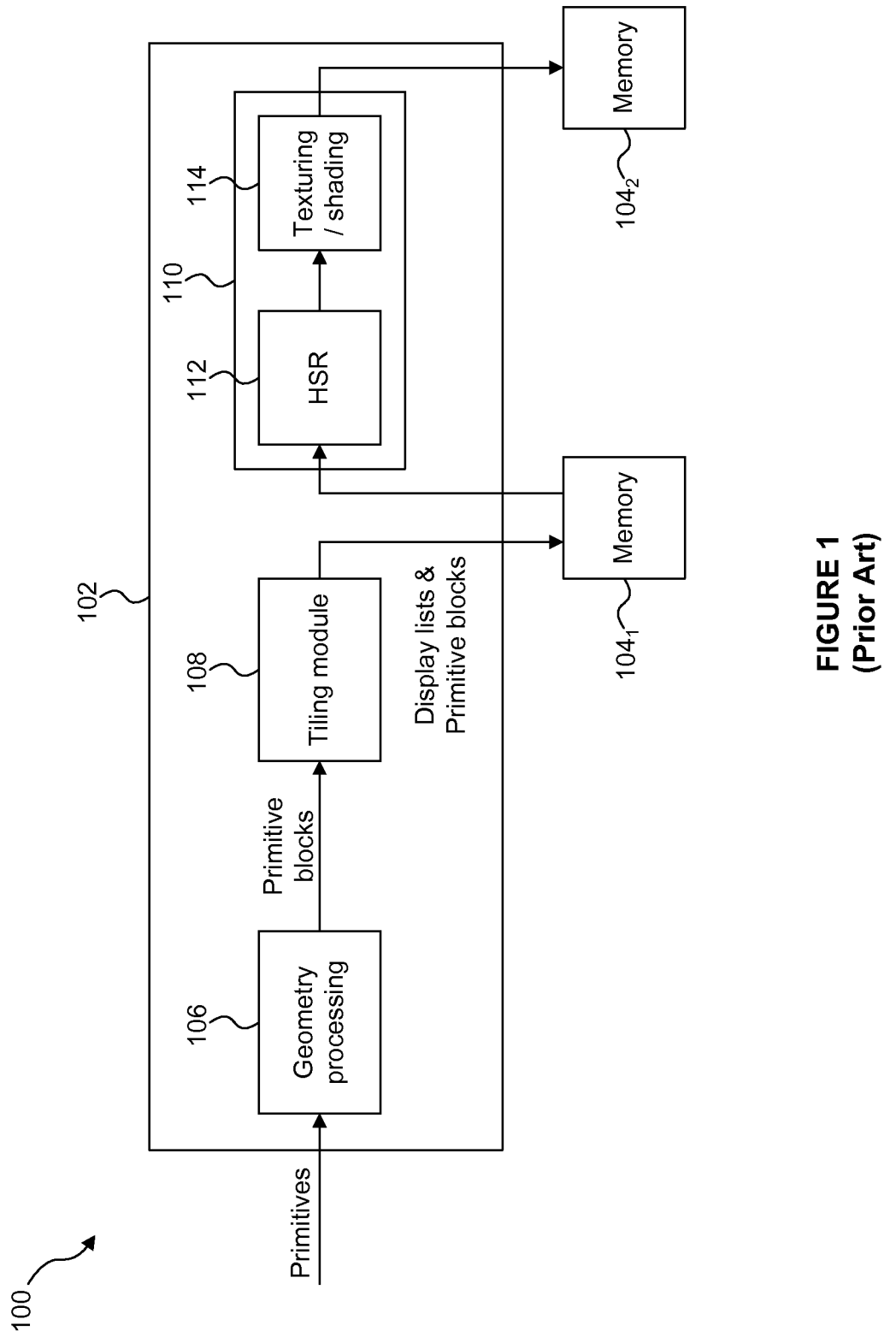
FIG. 1 is a schematic diagram of a graphics processing system of the prior art.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

In the system described above with reference to FIG. 1, the primitives are placed into a primitive block in the order that they are received by the graphics processing system 100, so that the sequence order of the primitives is maintained. The primitives may be distributed widely over a rendering space of the graphics processing system 100, but this distribution does not influence the order in which the primitives are placed into the primitive block. In particular, there may often be situations in which primitives with non-overlapping bounding boxes are included in the same primitive block. The inventors have realised that it may be beneficial to sort the primitives into primitive blocks according to their spatial positions, and that this is possible for non-overlapping primitives without causing problems due to changes in the sequence order of the primitives. That is, it is important to preserve the relative sequence order of primitives which overlap with each other, but it is not so important to preserve the relative sequence order of primitives which do not overlap with each other, and this flexibility in the relative ordering of non-overlapping primitives allows the primitives to be sorted into primitive blocks according to their spatial positions. As described in more detail below, by grouping primitives together into primitive blocks in accordance with their spatial positions, the performance of a HSR module and/or a texturing/shading module can be improved. For example, the cache coherency of the HSR module can be improved. As another example, in a tile-based rendering system, the HSR module may need to fetch fewer primitive blocks, thereby reducing the amount of primitive data that needs to be fetched by the HSR module.

Embodiments will now be described by way of example only.

Figure 2:
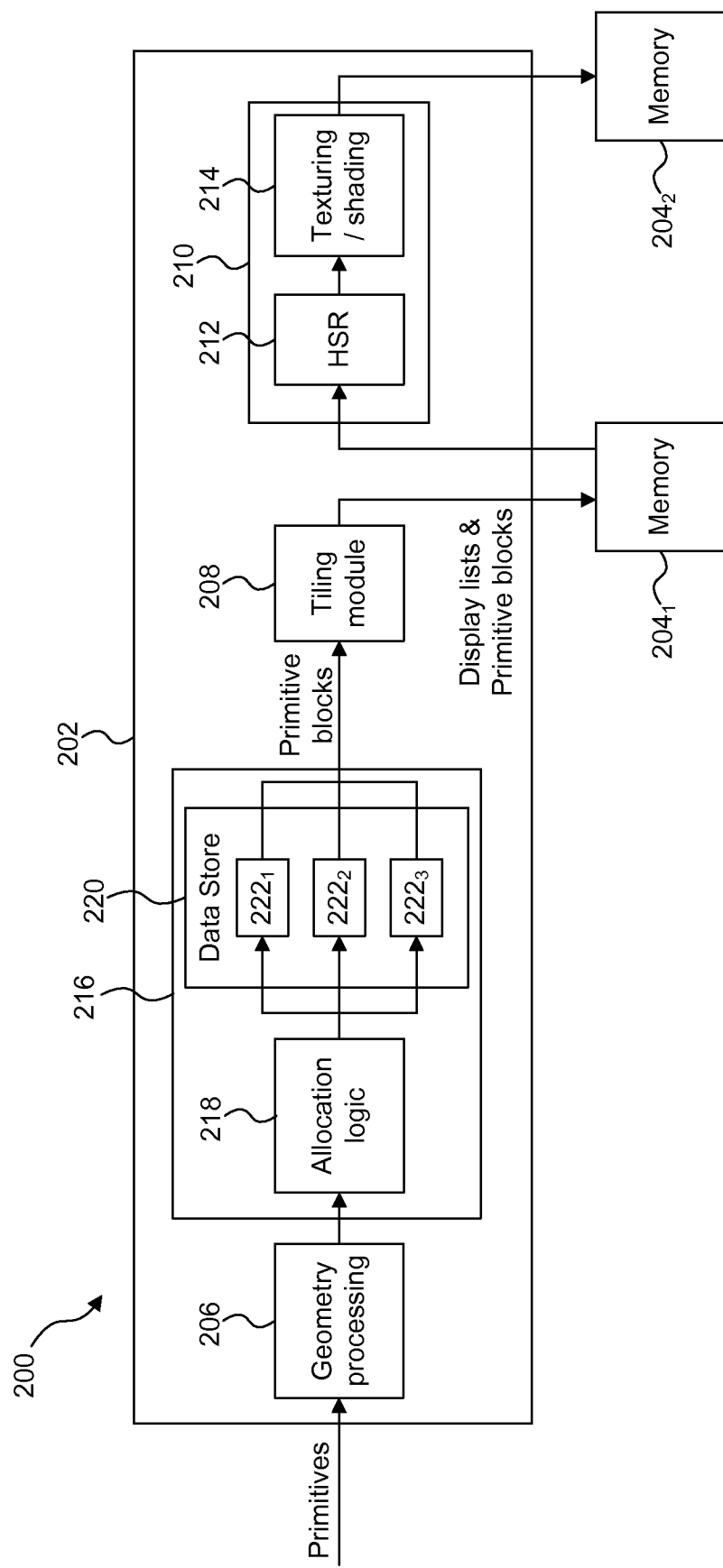
FIG. 2 is a schematic diagram of a graphics processing system including a primitive block allocation module.

FIG. 2 shows some elements of a graphics processing system 200 which may be used to render an image of a 3D scene. The graphics processing system 200 comprises a GPU 202 and two portions of memory $204_1$ and $204_2$. It is noted that the two portions of memory $204_1$ and $204_2$ may, or may not, be parts of the same physical memory, and both memories $204_1$ and $204_2$ may be situated "off-chip", i.e. not on the same chip as the GPU 202. Communication between the memories ($204_1$ and $204_2$) and the GPU 202 may take place over a communications bus in the system 200. The graphics processing system 200 is a tile-based deferred rendering system, meaning that the rendering space of the system 200 is divided into a plurality of tiles and that HSR is performed on a fragment prior to performing texturing and/or shading on the fragment in order to render the scene. However, in other examples, graphics processing systems may be non tile-based and/or not deferred rendering systems. The GPU 202 comprises a geometry processing module 206, a tiling module 208 and a rasterization module 210, wherein the rasterization module 210 comprises a hidden surface removal (HSR) module 212 and a texturing/shading module 214. The GPU 202 also comprises a primitive block allocation module 216 which is arranged to allocate primitives to primitive blocks in accordance with their spatial positions. The primitive block allocation module 216 comprises allocation logic 218 and a data store 220. The data store 220 is configured to store a set of primitive blocks $222_n$ to which primitives can be allocated. In the example shown in FIG. 2, the data store 220 can store up to three primitive blocks $222_1$ to $222_3$. In other examples, the data store 220 may have space for storing other numbers of primitive blocks, e.g. up to two or four or more primitive blocks. As a person skilled in the art would appreciate, the graphics processing system 200 shown in FIG. 2 may be part of a larger computer system (e.g. a smart phone, tablet, laptop, PC, TV, set top box, etc.) which, as described below with reference to FIG. 6, may comprise other elements such as a central processing unit (CPU), other memories and other devices (such as a display, speakers, microphone, keypad, etc.) which may be able to communicate with each other, e.g. over a communications bus.

An example of the operation of the graphics processing system 200 is described with reference to the flow chart shown in FIG. 3. Primitives are received at the geometry processing module 206 of the GPU 202 at step S302. The primitives may be received from an application which is running in the same computer system as the GPU. The primitives are received at the GPU 202 as a sequence and the order of the received primitives in the sequence may affect the way in which the primitives will be rendered, for example for translucent primitives.

In step S304, for a current primitive, the allocation logic 218 compares an indication of a spatial position of the current primitive with corresponding indications of the spatial positions of the open primitive blocks $222_1$ to $222_3$. Then in step S306 the allocation logic 218 allocates the current primitive to a primitive block (e.g. one of the open primitive blocks 222, or a new primitive block) based on the result of the comparison in step S304. In this way, the current primitive is allocated to a primitive block in accordance with its spatial position. In step S308 the allocation logic 218 determines whether there are more primitives to allocate to primitive blocks, and if there are then steps S304 and S306 are repeated for the next primitive. However, if there are no more primitives to allocate then the method passes from step S308 to step S310 in which the primitive blocks stored in the data store 220 are flushed to the tiling module 208. When further primitives are received at the primitive block allocation module 216 then the method can restart at step S302.

The preceding paragraph explains steps S304 and S306 at a high level, and these steps can be implemented in different ways in different examples, as described in more detail below.

Figure 4:
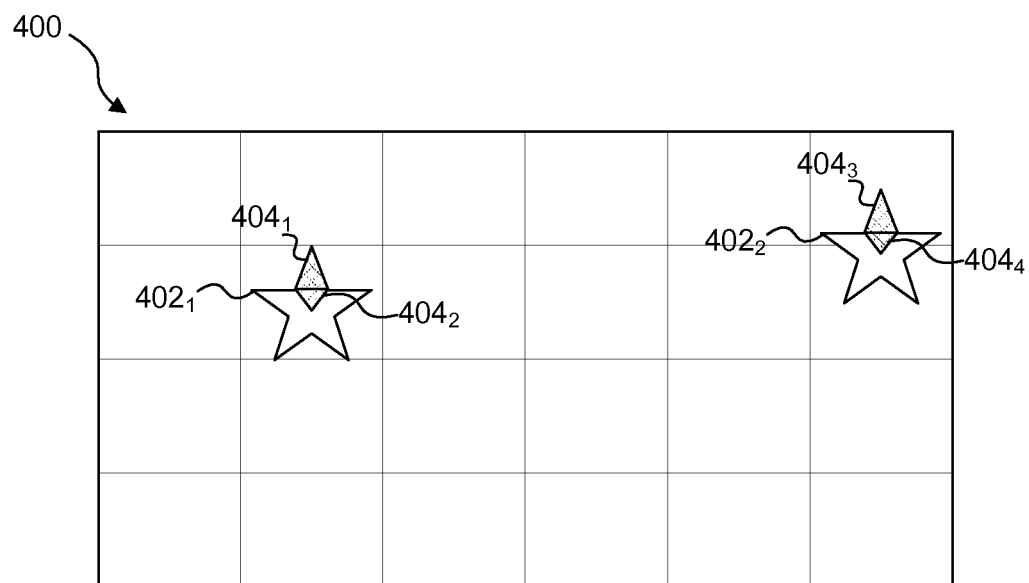
FIG. 4 is a representation of a scene to be rendered.

FIG. 4 shows a simple example of a scene 400 to be rendered in the graphics processing system 200. The scene 400 includes two similar objects $402_1$ and $402_2$ which are spatially separated from each other in the scene 400. The graphics processing system 200 is a tile-based rendering system which has a rendering space divided into a plurality of tiles. In the simple example shown in FIG. 4, the rendering space is divided into a 4×6 array of rectangular tiles. In other examples the rendering space may be divided into a different number and/or arrangement of tiles. In one example, each tile comprises 32×32 sample positions and there may be many tiles (e.g. hundreds of tiles) in the rendering space, depending upon the size and resolution of the image that is being rendered. In other examples tiles may be non-rectangular (e.g. triangular or hexagonal), or may vary in size according to their position in the rendering space. FIG. 4 also shows two primitives $404_1$ and $404_2$ of the object $402_1$, and two similar primitives $404_3$ and $404_4$ of the object $402_2$. In the example shown in FIG. 4 the primitives are triangles and may each be defined by vertex data at three vertices, but in other examples other types of primitives may be used wherein the primitives may be other shapes such as quadrilaterals or hexagons, or may be lines or points. The application may send the primitives to the graphics processing system 200 in an order that it deems to be suitable, and may for example group similar primitives together such that the primitives $404_1$, $404_3$, $404_2$ and $404_4$ may be sent one after another, i.e. consecutively in the sequence. As an example, primitives may be "similar", and therefore grouped together, if they have a similar state. It can therefore be appreciated that the sequence of primitives which is received at the GPU 202 might not have primitives grouped together spatially in the rendering space.

Furthermore, the geometry processing module 206 performs functions such as clipping and culling to remove primitives which do not fall into a visible view. The geometry processing module 206 may also project the primitives into screen-space. The primitives are passed from the geometry processing module 206 to the primitive block allocation module 216, such that the sequence of primitives is received by the allocation logic 218. The operations performed by the geometry processing module 206 may increase the occurrences of primitives, which are close to each other in the sequence of primitives received by the primitive block allocation module 216, being significantly spatially separated over the rendering space 400. If the primitives are placed into primitive blocks in strict sequence order as in the prior art graphics processing system 100, then it is likely that the four primitives $404_1$ to $404_4$ would all be placed into the same primitive block. Other primitives of object $402_1$ may be placed into a different primitive block. Therefore, when the tile in the second row of the second column is processed by the HSR module 112, two primitive blocks would need to be fetched from the memory $104_1$. In contrast, by grouping primitives together based on their spatial positions (as is done by the primitive block allocation module 216), when the tile in the second row of the second column is processed by the HSR module 212 it may be the case that fewer primitive blocks (e.g. only one primitive block) would need to be fetched from the memory $204_1$. This reduces the amount of data which needs to be fetched from the memory $204_1$. It is noted that although the HSR module 212 only needs to fetch the primitives from a primitive block which are visible in a tile, all the header data in the primitive block is needed even if there is only one primitive which is visible in the tile. Therefore for the same number of visible primitives in a tile, a reduction in the number of primitive blocks processed means less header data is fetched and a higher performance can be achieved in HSR module 212. Writing and reading data to and from the memories $204_1$ or $204_2$ is a relatively slow process in the processing of primitives by the system 200 especially when the memories are "off-chip", i.e. not on the same chip as the GPU 202. That is, data transfer between the GPU 202 and the memories $204_1$ and $204_2$, e.g. over a communications bus, is usually significantly slower than data transfer between components on the same integrated circuit chip. In tests, the system 200 has a reduction of approximately 10% in the amount of primitive data (which equates to a reduction of approximately 4% in the amount of total data) passed between the GPU 202 and the memory $204_1$ compared to an equivalent system (e.g. system 100) which does not spatially sort primitives into primitive blocks. The exact figures for the reductions depend upon the properties of the scene being rendered. A reduction such as this in the amount of data passed between the GPU 202 and the memory $204_1$ can make a significant improvement to the speed and efficiency of the graphics processing system 200.

The primitives received at the primitive block allocation module 216 are processed by the allocation logic 218, e.g. one at a time, to thereby allocate the primitives to primitive blocks. Initially there might not be any open primitive blocks in the data store 220 and when the first primitive is received, a new primitive block $222_1$ is created and stored in the data store 220 and the primitive is allocated to the new primitive block $222_1$. After some further primitives have been received, the data store 220 may have a plurality of open primitive blocks (e.g. up to three primitive blocks $222_1$ to $222_3$ in the example shown in FIG. 2) to which a primitive can be allocated. A primitive block is "open" if it is not completely full, i.e. such that further primitives can be allocated to it. When a primitive block is filled (e.g. such that it cannot have further primitives allocated to it) then it is flushed, i.e. outputted, from the data store 220 and provided to the tiling module 208. For each open primitive block the primitive block allocation module 216 maintains a bounding box, which is a region in screen space that bounds all the primitives allocated to that primitive block. A bounding box might have many different forms. For example, a bounding box may be rectangular or any other suitable bounding shape, e.g. a polygon or a circle, and a bounding box may, or may not, be aligned with the axes of the image. The resolution of a bounding box may be different in different examples, and may for example be rounded up to the resolution of whole tiles or may have a different (e.g. finer) resolution than the tile resolution. The open primitive blocks $222_1$ to $222_3$ stored in the data store 220 at any given time have non-overlapping bounding boxes. That is, the set of open primitive blocks $222_1$ to $222_3$ are spatially separated from each other. As described herein, the primitive block allocation module 216 attempts to allocate primitives to primitive blocks such that the primitive blocks remain spatially separated from each other.

Figure 5:
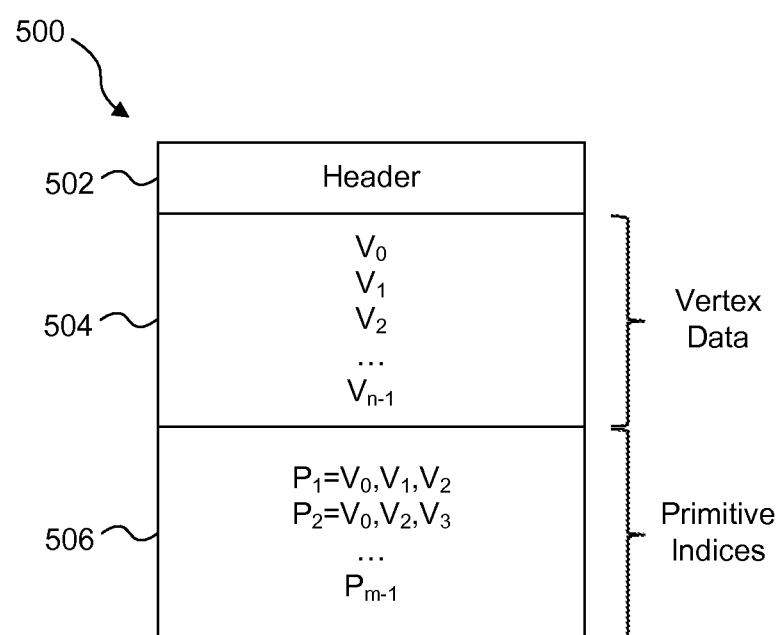
FIG. 5 is a representation of a primitive block.

A primitive block is a data construct for storing primitive data, which can be stored in a parameter memory, such as memory $204_1$. FIG. 5 shows an example of a primitive block 500. The primitive block 500 includes a header 502 which includes state information (such as a depth compare mode, a blending state, a texture state, a primitive type, etc.) to describe how the primitives in the primitive block are to be rendered. The primitive block 500 also includes vertex data 504. The vertex data comprises data for each of the vertices of the primitives included in the primitive block 500. In the example shown in FIG. 5 there are n vertices ($V_0$ to $V_{n-1}$) and the data for each vertex may include for example a set of coordinates in scene space (i.e. 3D model space), XYZ, to describe the position of the vertex; and a set of attributes to describe the appearance of the vertex, such as texture coordinates (U,V) and/or a base colour to apply to the vertex. The primitive block 500 also includes primitive index data 506. The primitive index data comprises a set of indices (e.g. three indices for triangular primitives) for each of the primitives included in the primitive block 500 to define which of the vertices make up each of the primitives. In the example shown in FIG. 5 there are m primitives ($P_0$ to $P_{m-1}$). It is noted that primitives in the primitive block 500 may share vertices, e.g. primitives P1 and P2 (which may correspond to primitives $404_1$ and $404_2$ shown in FIG. 4) share two vertices ($V_0$ and $V_2$). It can be appreciated that increasing the number of vertices in a primitive block which are shared between multiple primitives will reduce the amount of data of the primitive block. There is a maximum number of vertices (i.e. a vertex threshold) that can be included in a primitive block and/or a maximum number of primitives (i.e. a primitive threshold) that can be included in a primitive block. For example, the vertex threshold may be 64, 256 or some other suitable amount, and the primitive threshold may be 128, 512 or some other suitable amount.

Figure 3:
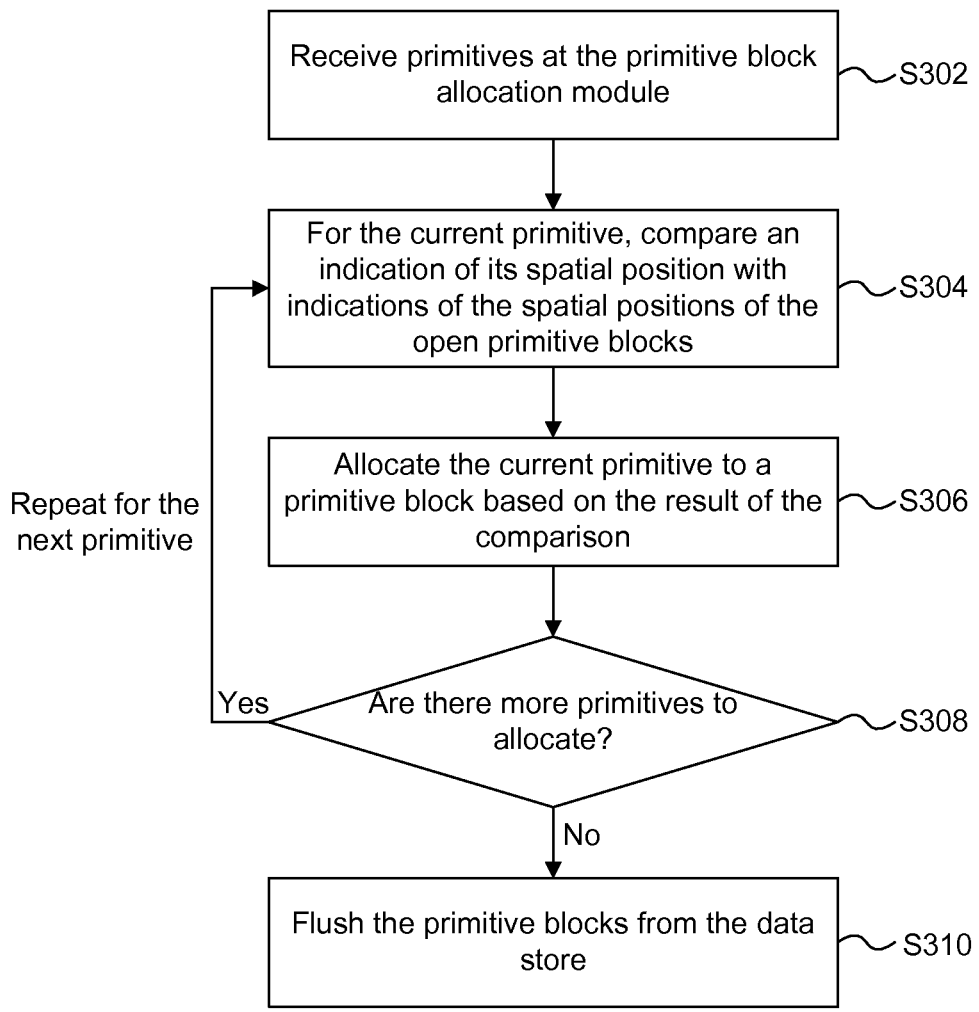
FIG. 3 is a flow chart illustrating a method of allocating primitives to primitive blocks at a primitive block allocation module.

Returning to the process of FIG. 3, the indication of a spatial position of a primitive may comprise a vertex of the primitive. That is, a primitive may include three vertices and the positions of the vertices provide indications of the spatial position of the primitive. Similarly, an indication of a spatial position of a primitive block may comprise a vertex of a primitive included in the primitive block. In this case, the spatial position of a primitive can be compared with the spatial position(s) of the open primitive block(s) 222 by determining whether the primitive has one or more shared vertices with an open primitive block.

If the current primitive shares one or more vertices with a single one of the open primitive blocks 222 then in step S306 the allocation logic 218 allocates the primitive to that primitive block 222. If the current primitive shares one or more vertices with a plurality of the open primitive blocks 222 then in step S306 the allocation logic 218 attempts to merge those primitive blocks, so that the primitive can be allocated to the resulting merged primitive block 222. However, it may not be possible to merge the primitive blocks, if for example the resulting merged primitive block would exceed the maximum allowed number of vertices or the maximum allowed number of primitives that can be included in a primitive block. In this case one of the primitive blocks is flushed from the data store 220 and the current primitive is allocated to the remaining primitive block with which it shares one or more vertices. If the current primitive does not share a vertex with any of the open primitive blocks 222 then the current primitive may be allocated to one of the open primitive blocks 222 based on some other indication of spatial position (e.g. based on the bounding box of the primitive and the bounding boxes of the primitive blocks as described below), or a new primitive block may be opened so that the current primitive can be allocated to the new primitive block.

Another indication of a spatial position is a bounding box, which may be used, e.g. if a primitive has no shared vertices with any of the open primitive blocks. For example, a primitive may have a bounding box within which it is entirely located. Similarly, each of the primitive blocks 222 may have bounding boxes within which all of the primitives within the primitive block are located. The resolution of the bounding boxes may be different in different examples, and may for example be at a per-tile resolution or a per-sample resolution (i.e. at the resolution of the sampling grid). The shape of the bounding boxes may be different in different examples, and may for example be rectangular. The spatial position of a primitive can be compared with the spatial position(s) of the open primitive block(s) 222 by determining whether the bounding box of the primitive overlaps with, or is within a minimum distance from overlapping with, the bounding box of an open primitive block. The minimum distance may for example be 0, 1, 2 or more tiles, and if the bounding box of a current primitive is within the minimum distance from the bounding box of the primitive block then it is treated as though it has an overlapping bounding box with the primitive block.

If a current primitive has an overlapping bounding box with a single one of the open primitive blocks 222 then in step S306 the allocation logic 218 allocates the primitive to that primitive block 222. If the current primitive has an overlapping bounding box with a plurality of the open primitive blocks 222 then in step S306 the allocation logic 218 attempts to merge those primitive blocks, so that the primitive can be allocated to the resulting merged primitive block 222. However, it may not be possible to merge the primitive blocks, if for example the resulting merged primitive block would exceed the maximum allowed number of vertices or the maximum allowed number of primitives that can be included in a primitive block. In this case one of the primitive blocks is flushed from the data store 220 and the current primitive is allocated to the remaining primitive block with which it has an overlapping bounding box.

More generally, if a current primitive has a spatial position which matches the spatial position of a single one of the open primitive blocks (e.g. as indicated by having one or more shared vertices or an overlapping bounding box with the primitive block) then the received primitive is allocated to that primitive block. Furthermore, if a current primitive has a spatial position which matches the spatial position of a plurality of the open primitive blocks (e.g. as indicated by having one or more shared vertices or an overlapping bounding box with the plurality of primitive blocks) then the matching open primitive blocks are merged and/or flushed as appropriate until there is only one matching open primitive block in the data store 220 which has a spatial position matching that of the current primitive and then the current primitive is added to that primitive block. When a primitive is allocated to a primitive block, if the primitive does not lie within the bounding box of the primitive block then the bounding box of the primitive block is updated to include the primitive.

If the spatial position of the current primitive does not match the spatial position of any of the open primitive blocks 222 (e.g. if the bounding box of the primitive does not overlap with, and is not within a minimum distance from overlapping with, the bounding box of an open primitive block) then a new primitive block may be added to the set of open primitive blocks (if possible), such that the current primitive can then be allocated to the new primitive block. However, if the maximum number (e.g. three, in the example shown in FIG. 2) of open primitive blocks are stored in the data store 220 then a new primitive block cannot be created and stored in the data store 220 without flushing one of the primitive blocks from the data store 220. Therefore, if the data store 220 does not have space to store the new primitive block then one of the stored primitive blocks is outputted from the data store 220 to provide space for the new primitive block. This may result in primitive blocks being flushed from the data store 220 before they are completely full. This may mean that more primitive blocks are used than if all of the primitive blocks were completely filled before being flushed, but the benefit of having primitives grouped into primitive blocks based on their spatial positions (such that the primitive blocks have small bounding boxes) normally outweighs any drawback of increasing the number of primitive blocks. In an extreme case when primitives are scattered on screen resulting in many non overlapping primitive blocks each with a few primitives, two of the non overlapping primitive blocks with a low number of primitives (e.g. primitive blocks which are less than half full of primitives) can be merged together rather than flushing one of the primitive blocks. This provides space in the data store 220 to create a new primitive block without flushing too many unfilled primitive blocks.

In alternative examples, a current primitive may be allocated to one of the open primitive blocks 222 (e.g. the closest primitive block) even if the spatial position of the current primitive does not match the spatial position of any of the open primitive blocks 222. In some situations, this may be preferable to flushing a primitive block from the data store 220 and starting a new primitive block.

When one of the open primitive blocks is to be flushed before it is completely filled, e.g. to provide space for adding a primitive block to the data store 220, then a selection is made to determine which one of the open primitive blocks is to be flushed. The selection may be made in accordance with an outputting scheme (or "flushing scheme"). In terms of the sequence order of the primitives, it does not matter which of the open primitive blocks are flushed from the data store 220 because the open primitive blocks are non-overlapping with respect to each other. It is important to maintain the order of primitives at each particular sample position in the rendering space, but it is not crucial to maintain the ordering of non-overlapping primitives with respect to each other. That is, the relative ordering of primitives which cover a particular sample position should be maintained, but since the open primitive blocks stored in the data store 220 are non-overlapping, any of the open primitive blocks can be flushed without breaking the ordering of primitives at particular sample positions.

When two of the open primitive blocks are merged, the primitives from one of the primitive blocks can be appended to the primitives in the other primitive block to form the primitives in the resulting merged primitive block. There is no need to re-order the primitives within the merged primitive block in accordance with their sequence positions because the open primitive blocks (before merging) were non-overlapping so a simple append operation will not result in a deviation from the sequence order of primitives at any particular sample position in the rendering space.

The flushing scheme could be any suitable scheme for selecting which of the open primitive blocks 222 to flush from the data store 220. For example, the flushing scheme could be:
  (i) a round robin scheme;
  (ii) an output the biggest scheme in which the primitive block with the most primitives is selected to be outputted;
  (iii) an output the smallest scheme in which the primitive block with the fewest primitives is selected to be outputted;
  (iv) an output the oldest scheme in which the primitive block which has been in the data store 220 for the longest amount of time is selected to be outputted;
  (v) a merge and output smallest and biggest scheme in which the primitive block with the most primitives and the primitive block with the fewest primitives are merged and the resulting merged primitive block is then selected to be outputted;
  (vi) a merge threshold scheme in which any primitive blocks with fewer than a threshold number of primitives are merged and the resulting merged primitive block is then selected to be outputted;
  (vii) a merge smallest scheme in which the two primitive blocks with the fewest primitives are merged and the resulting merged primitive block is kept in the data store 220, wherein in this case one of the primitive blocks 222 is selected to be outputted only if merging is not possible; or
  (viii) a combination of any of the above flushing schemes.

Testing was performed to determine which of the flushing schemes provided the best results in terms of the reduction in the amount of parameter data passing between the GPU 202 and the memory 204$_1$, and it was found that the merge smallest scheme (scheme vii) gave the best results.

In some examples, if a render state changes (e.g. if the depth compare mode or type of primitives) changes or if the end of the sequence of primitives for an image is encountered then the open primitive blocks 222 are flushed from the data store 220. This might be inefficient if the render state is changing rapidly (e.g. alternating between two render states), so in some examples a rapidly changing render state can be detected and in this case some primitive blocks might not be flushed when the render state changes to reduce the number of separate primitive blocks that are flushed. The limit on the number of open primitive blocks 222 which can be stored in the data store 220 affects the average fullness of the primitive blocks which are flushed from the data store 220. For example, increasing the number of open primitive blocks 222 which can be stored in the data store 220 will provide more opportunities for allocating a primitive to an open primitive block without needing to flush any primitive blocks from the data store 220, but it will also increase the number of primitive blocks which are flushed before they are completely filled due to render state changes. Increasing the average fullness of the primitive blocks reduces the number of primitive blocks that are used, which thereby reduces the amount of data that is transferred from the GPU 202 to the memory $204_1$ because each primitive block includes header data. The optimum limit on the number of open primitive blocks is dependent upon the image which is being rendered. Therefore, the primitive block allocation module 216 may dynamically adapt the limit on the number of open primitive blocks 222 which can be stored in the data store 220 based on an analysis of the received primitives. For example, the limit could be set initially at three (as shown in FIG. 2) and if the average fullness of the flushed primitive blocks could be increased by increasing the limit (e.g. if the incoming primitives are widely spatially distributed over the rendering space) then the limit could be increased, e.g. to four. Similarly, if the average fullness of the flushed primitive blocks could be increased by decreasing the limit (e.g. if the rendering state is changing frequently) then the limit could be decreased, e.g. to two. The limit itself may have a maximum which it cannot exceed which may be determined by the amount of on-chip memory. Increasing the maximum value of the limit on the number of open primitive blocks which can be stored in the data store 220 means that the data store needs a greater amount of on-chip memory, which is a very limited resource, so keeping the maximum value of the limit on the number of open primitive blocks 222 which can be stored in the data store 220 low (e.g. less than five) may be advantageous.

Each primitive block has an index map which maps the indices of the vertices in the primitive block to the indices of the vertices sent from the application. When primitive blocks are merged the index map of the merged primitive block will need to be updated to reflect the new indices of the vertices in the merged primitive block accordingly.

The primitive blocks which are outputted from the primitive block allocation module 216 are passed to the tiling module 208 which determines which primitives are present within each of the tiles of the rendering space of the graphics processing system 200. The tiling module 208 determines per-tile display lists which indicate which primitives are present within each of the tiles of the rendering space. The display lists and the primitive blocks are outputted from the tiling module 208 and stored in the memory $204_1$. The rasterization block 210 fetches the display list for a tile and the primitive blocks relevant to that tile from the memory $204_1$ and the HSR module 212 performs hidden surface removal to thereby remove fragments of primitives which are hidden in the scene. The remaining fragments are passed to the texturing/shading module 214 which performs texturing and/or shading on the fragments to determine pixel values of a rendered image which can be passed to the memory $204_2$ for storage in a frame buffer. The rasterization block 210 processes each of the tiles and when the whole image has been rendered and stored in the memory $204_2$, the image can be outputted from the graphics processing system 200 and, for example, displayed on a display.

The sorting of primitives into primitive blocks based on their spatial locations may result in a greater number of primitive blocks because some primitive blocks are not completely filled before they are flushed from the data store 220, so there may be a slight increase in the amount of primitive data written out from the GPU 202 to the memory $204_1$ due to an increased number of primitive block headers. However, due to the spatial sorting of the primitives into primitive blocks, primitives included in a primitive block are more likely to share vertices, such that the amount of data used to represent the primitives can be reduced since the shared vertex data need only be stored once in the primitive block. Furthermore, any slight increase in the amount of primitive data written out from the GPU 202 to the memory $204_1$ is greatly outweighed by a reduction in the amount of primitive data that is read from the memory $204_1$ by the rasterization module 210 for use by the HSR module 212. That is, since the HSR module 212 operates on a tile, it reads in primitive blocks containing primitives which are relevant to that tile and due to the spatial sorting of primitives into the primitive blocks fewer primitive blocks will be needed to be read from the memory $204_1$ by the HSR module 212 for performing HSR for a tile. Therefore, the examples described herein are particularly useful when the primitive block allocation module 216 is included as part of a tile-based graphics processing system. However, the spatial grouping of primitives into primitive blocks also improves the cache hit rate for primitives fetched by the HSR module 216 and this is useful for both tile-based and non-tile based rendering systems.

Some pseudo code is presented below as an example of code which can be used to implement the graphics processing system 200:

```
// Check the current primitive for vertex sharing and overlapping
bounding boxes
For each of the existing open primitive blocks check if the current
primitive has shared vertices or an overlapping bounding box:
    If number of shared vertices > 0 in the primitive block, then
        Increase number of overlapping primitive blocks by 1
        Increase number of the primitive blocks with shared
        vertices by 1
    Else if the current primitive overlaps the bounding box of
    the primitive block
        Increase number of overlapping primitive blocks by 1
    End if
End for
// Add the current primitive into one of the primitive blocks
If no primitive block overlaps the current primitive:
    If the number of existing open primitive blocks = the maximum
    number of open
    primitive blocks
        Flush one of the primitive blocks first, according to
        a flushing scheme.
    End if
    Add the current primitive into an empty primitive block.
Else if the current primitive shares vertices or overlaps with
only one primitive block:
    Add the current primitive to that primitive block.
Else (the current primitive overlaps with more than one primitive
block):
    If the current primitive has shared vertices with more than
    one primitive block:
        If all the primitive blocks that share vertices with
        the current primitive can
        be merged into one:
            Merge all the primitive blocks into one.
        Else
            For all the primitive blocks
                Merge the first two primitive blocks.
                Flush the first primitive block if cannot merge.
            Until there is only one primitive block that shares
            vertices with the current primitive.
        End if
        Add the current primitive to the one primitive block.
```

```
    Else (the primitive overlaps with more than one primitive
      block):
        If the primitive shares vertices with one primitive block
          Let b be the only primitive block sharing vertices
            with the primitive.
          Merge all the blocks that overlap the primitive.
          If a block different from b cannot be merged this
            way, flush it.
          Add the current primitive in the one primitive block b.
        Else (No block with shared vertices)
          Let M be the set of primitive blocks overlapping
            the primitive.
          If it is possible to merge all blocks in M into
            one single block b, do it.
          Else
            Merge all possible couples of block in M;
            If a block cannot be merged this way, flush it.
            End If
          End if
          Let b be the only primitive block overlapping
            the primitive.
            Add the current primitive in the one primitive block b.
          End if
        End if
    End if
  // Add the primitive to block b
  If there is no space to add the current primitive in the primitive
    block b:
      Flush the primitive block b first.
      Add the current primitive into the new primitive block.
    Else
      Add the primitive to the primitive block b, checking for
        shared vertices.
    End if
```

The allocation logic 218 may be implemented on the GPU 202 in hardware or software or a combination thereof. For example, if the allocation logic 218 is implemented in hardware it may be formed as a particular arrangement of transistors and other hardware components which is suited for performing the desired function of the allocation logic as described herein. In contrast, if the allocation logic 218 is implemented in software it may comprise a set of computer instructions which can be stored in a memory and can be provided to the GPU 202 for execution thereon. Furthermore, although in the examples described herein, the graphics processing system uses a GPU, in other examples a general purpose processing unit, e.g. a CPU, could be used to implement the functionality which is described herein as being implemented on the GPU 202.

Figure 6:
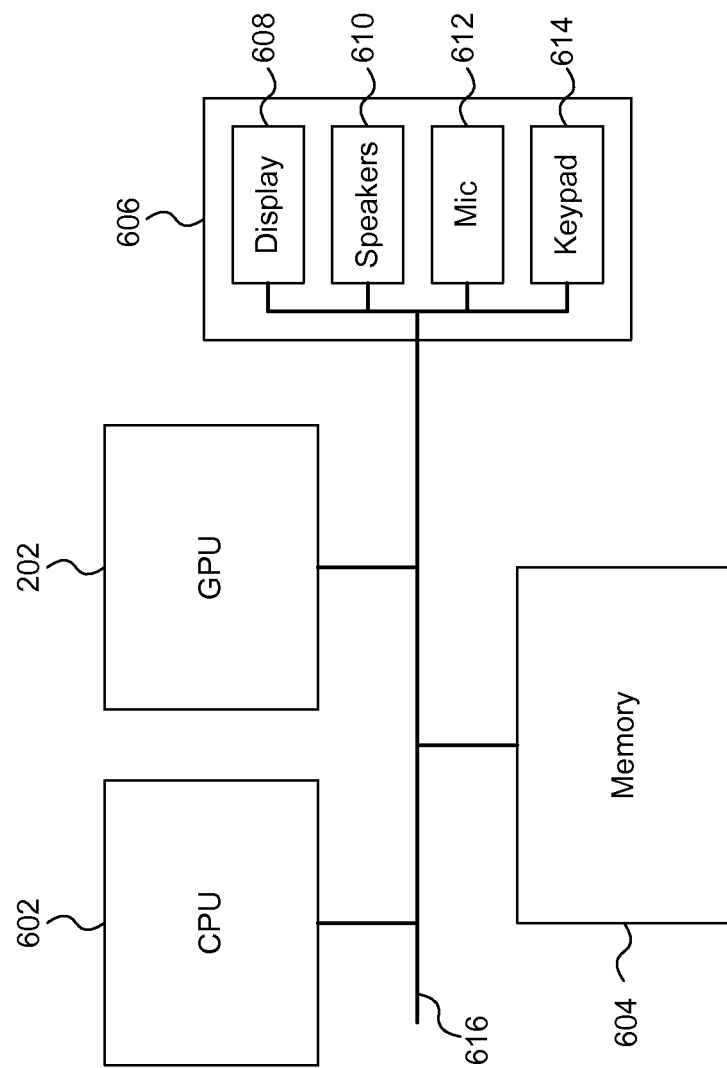
FIG. 6 is a schematic diagram of a computer system.

The graphics processing system 200 described above can be implemented in a computer system. For example, FIG. 6 shows a computer system which comprises the GPU 202, a CPU 602 and a memory 604, wherein the memory 604 may include memory blocks corresponding to memories $204_1$ and $204_2$ described above. The computer system also comprises other devices 606, such as a display 608, speakers 610, a microphone 612 and a keypad 614. The components of the computer system can communicate with each other via a communications bus 616. Computer program code for an application may be stored in the memory 604, and may for example be executed on the CPU 602. If the application needs to render an image of a 3D scene, the primitives can be sent to the GPU 202, and the GPU 202 can render the scene as described above.

Generally, any of the functions, methods, techniques or components described above (e.g. the primitive block allocation module 216 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the allocation logic 218) may comprise hardware in the form of circuitry.

Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. allocation logic 218) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a graphics processing unit comprising a primitive block allocation module configured to perform any of the methods described herein, or for generating a graphics processing system comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a graphics processing unit comprising a primitive block allocation module as described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of processing primitives for rendering an image of a three dimensional scene in a computer graphics processing system in which primitive data is stored in blocks of a data store by primitive allocation logic of the computer graphics processing system, wherein the primitives are defined by vertices, the method comprising:
    for each of a plurality of received primitives:
        (i) comparing an indication of a spatial position in the scene of the received primitive with at least one indication of a spatial position in the scene of at least one block of the data store, wherein the at least one block of the data store comprises vertex data for vertices of previously received primitives, and
        (ii) storing primitive data for the received primitive in a block of the data store based on a result of the comparison, such that the received primitive is stored in a block in accordance with its spatial position, wherein the primitive data for the received primitive comprises vertex data for vertices of the received primitive; and
    processing the primitive data stored in the blocks of the data store in the computer graphics processing system to render the image.

2. The method of claim 1, wherein said processing primitive data comprises outputting the primitive data stored in the blocks of the data store by the primitive allocation logic.

3. The method of claim 2, wherein said processing primitive data further comprises:
    receiving the outputted primitive data at a tiling module of the computer graphics processing system; and
    using the received primitive data at the tiling module to determine which primitives are present within each of a plurality of tiles.

4. The method of claim 1, wherein for each of the received primitives, said comparing comprises comparing an indication of a spatial position in the scene of the received primitive with respective indications of spatial positions in the scene of at least two blocks of the data store.

5. The method of claim 1, wherein in response to the result of the comparison indicating that the spatial position in the scene of the received primitive matches the spatial position in the scene of a single one of the blocks of the data store, the received primitive is allocated to said one of the blocks.

6. The method of claim 1, further comprising, in response to the result of the comparison indicating that the spatial position in the scene of the received primitive matches the spatial position in the scene of a plurality of the blocks of the data store, merging said plurality of blocks to form a merged block, wherein the received primitive is allocated to the merged block.

7. The method of claim 1, further comprising, in response to the result of the comparison indicating that the spatial position in the scene of the received primitive does not match the spatial position in the scene of any of the blocks of the data store, creating a new block to be included in said data store, wherein the received primitive is allocated to the new block.

8. The method of claim 7, further comprising:
    determining that the data store does not have space to store the new block; and
    in response to determining that the data store does not have space to store the new block, outputting one of the blocks from the data store to provide space for the new block.

9. The method of claim 8, further comprising selecting a block to be outputted from the data store in accordance with an outputting scheme, wherein the outputting scheme comprises one or more of:
    (i) a round robin scheme;
    (ii) an output the biggest scheme in which a block with the most primitives is selected to be outputted;
    (iii) an output the smallest scheme in which a block with the fewest primitives is selected to be outputted;
    (iv) an output the oldest scheme in which a block which has been in the data store for the longest amount of time is selected to be outputted;
    (v) a merge and output smallest and biggest scheme in which a block with the most primitives and a block with the fewest primitives are merged and the resulting merged block is then selected to be outputted;
    (vi) a merge threshold scheme in which any blocks with fewer than a threshold number of primitives are merged and the resulting merged block is then selected to be outputted; and
    (vii) a merge smallest scheme in which two blocks with the fewest primitives are merged and the resulting merged block is kept in the data store, wherein one block from the data store is selected to be outputted if merging is not possible.

10. The method of claim 1, wherein each of the blocks of the data store includes a header which includes state information indicating how to render the primitives in that block.

11. A computer graphics processing system configured to process primitives to render an image of a three dimensional scene, wherein the primitives are defined by vertices, the computer graphics processing system comprising:
- a data store configured to store primitive data in blocks of the data store; and
- primitive allocation logic configured to, for each of a plurality of received primitives:
  - (i) compare an indication of a spatial position in the scene of the received primitive with at least one indication of a spatial position in the scene of at least one block of the data store, wherein the at least one block of the data store comprises vertex data for vertices of previously received primitives, and
  - (ii) store primitive data for the received primitive in a block of the data store based on a result of the comparison, such that the received primitive is stored in a block in accordance with its spatial position, wherein the primitive data for the received primitive comprises vertex data for vertices of the received primitive.

12. The computer graphics processing system of claim 11, further comprising a tiling module configured to determine which primitives are present within each of a plurality of tiles.

13. The computer graphics processing system of claim 12, wherein the primitive allocation logic is configured to:
- allocate primitives to blocks of the data store prior to tiling; and
- provide blocks to the tiling module.

14. The computer graphics processing system of claim 11, wherein the indication of a spatial position in the scene of the received primitive comprises a vertex of the received primitive, and an indication of a spatial position of a block of the data store comprises a vertex of a primitive stored in that block, wherein the primitive allocation logic is configured to compare vertices of the received primitive and vertices of blocks of the data store to determine whether the received primitive has one or more shared vertices with a block of the data store.

15. The computer graphics processing system of claim 11, wherein the indication of a spatial position in the scene of the received primitive comprises a bounding box of the received primitive, and an indication of a spatial position in the scene of a block of the data store comprises a bounding box of that block, wherein the primitive allocation logic is configured to compare the bounding box of the received primitive and the bounding boxes of blocks of the data store to determine whether the bounding box of the received primitive overlaps with, or is within a minimum distance from overlapping with, the bounding box of a block of the data store.

16. The computer graphics processing system of claim 11, wherein the primitive allocation logic is further configured such that, responsive to the received primitive being stored in a block and responsive to determining that the received primitive does not lie within a bounding box of that block, the bounding box of that block is updated to include the received primitive.

17. The computer graphics processing system of claim 11, further configured to output a block from the data store if that block is full.

18. The computer graphics processing system of claim 12, wherein the tiling module is configured to determine per-tile display lists which indicate which primitives are present within each of a plurality of tiles, and wherein the computer graphics processing system further comprising a rasterization block which is configured to implement hidden surface removal and texturing or shading on a per-tile basis using the per-tile display lists.

19. The computer graphics processing system of claim 11, wherein the indication of a spatial position in the scene of the received primitive comprises a bounding box of the received primitive, and an indication of a spatial position of a block of the data store comprises a bounding box of that block, wherein the bounding boxes have a per-tile resolution.

20. A non-transitory computer readable storage medium having stored thereon processor executable instructions that when executed at a computer system for generating a representation of a digital circuit from definitions of circuit elements and data defining rules for combining those circuit elements, cause the computer system to generate a graphics processing unit configured to process primitives to render an image of a three dimensional scene, wherein the primitives are defined by vertices, the graphics processing unit comprising:
- a data store configured to store primitive data in blocks of the data store; and
- primitive allocation logic configured to, for each of a plurality of received primitives:
  - (i) compare an indication of a spatial position in the scene of the received primitive with at least one indication of a spatial position in the scene of at least one block of the data store, wherein the at least one block of the data store comprises vertex data for vertices of previously received primitives, and
  - (ii) store primitive data for the received primitive in a block of the data store based on the result of the comparison, such that the received primitive is stored in a block in accordance with its spatial position, wherein the primitive data for the received primitive comprises vertex data for vertices of the received primitive.

* * * * *